(12) United States Patent
Gentile et al.

(10) Patent No.: US 9,683,447 B2
(45) Date of Patent: Jun. 20, 2017

(54) COMPONENTS RESISTANT TO TRAVELING WAVE VIBRATION AND METHODS FOR MANUFACTURING THE SAME

(71) Applicant: HONEYWELL INTERNATIONAL INC., Morristown, NJ (US)

(72) Inventors: David P. Gentile, Chandler, AZ (US); Jeff Lentz, Chandler, AZ (US); Gerhard Schroeder, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 473 days.

(21) Appl. No.: 14/250,681

(22) Filed: Apr. 11, 2014

(65) Prior Publication Data
US 2015/0292337 A1    Oct. 15, 2015

(51) Int. Cl.
*B63H 1/28*    (2006.01)
*F01D 5/26*    (2006.01)
(Continued)

(52) U.S. Cl.
CPC .............. *F01D 5/26* (2013.01); *F01D 5/027* (2013.01); *F01D 5/34* (2013.01); *F05D 2230/10* (2013.01);
(Continued)

(58) Field of Classification Search
CPC . F01D 5/26; F01D 5/027; F01D 5/034; F05D 2230/10; F05D 2250/294; F05D 2260/961; Y02T 50/671
(Continued)

(56) References Cited

U.S. PATENT DOCUMENTS 1,360,936 A * 11/1920 Guy ................... F01D 5/027
                                                             415/104
4,879,792 A * 11/1989 O'Connor ........... F01D 5/027
                                                             29/889

(Continued)

FOREIGN PATENT DOCUMENTS

EP    1813773 A2    8/2007
GB    1458524 A  * 12/1976 ............... F01D 5/10

OTHER PUBLICATIONS

Bisegna, P. et al; A Continuous Model for the Dynamical Analysis of Mistuned Bladed Rotors; Hindawi Publishing Corporation, International Journal of Rotating Machinery; vol. 2012, Article ID 378565, doi:10.1155/2012/378565, Copyright 2012.

(Continued)

*Primary Examiner* — Jessica Cahill
(74) *Attorney, Agent, or Firm* — Lorenz & Kopf, LLP (57) ABSTRACT

Components resistant to traveling wave vibration and methods for manufacturing the same are provided. The component comprises a component body and a plurality of features disposed thereabout according to an asymmetry pattern that separates a pair of repeated eigenvalues associated with a targeted mode that deflects in excess of a threshold deflection limit in response to traveling wave excitation. The method comprises identifying, in a model of a rotationally periodic component, one or more modes thereof that deflect in excess of a threshold deflection limit in response to a traveling wave excitation. Each of the modes has a pair of repeated eigenvalues associated therewith. An asymmetry pattern is determined that separates each pair of repeated eigenvalues by a desired frequency split. A plurality of features are formed and disposed according to the asymmetry pattern about the component body defining an asymmetrical component comprising the component resistant to traveling wave vibration.

15 Claims, 10 Drawing Sheets

(51) Int. Cl.
*F01D 5/02* (2006.01)
*F01D 5/34* (2006.01)

(52) U.S. Cl.
CPC .. *F05D 2250/294* (2013.01); *F05D 2260/961* (2013.01); *Y02T 50/671* (2013.01)

(58) Field of Classification Search
USPC .............................................. 416/144, 244 A
See application file for complete search history.

(56) References Cited

U.S. PATENT DOCUMENTS

| | | | |
|---|---|---|---|
| 5,151,325 A * | 9/1992 | Draskovich | C04B 35/6316 415/200 |
| RE39,630 E * | 5/2007 | Stangeland | F01D 5/10 416/190 |
| 7,296,976 B2 * | 11/2007 | Roever | F01D 5/027 416/144 |
| 7,383,136 B1 | 6/2008 | Griffin et al. | |
| 8,353,670 B2 * | 1/2013 | Glasspoole | F01D 5/027 416/144 |
| 2010/0074752 A1 * | 3/2010 | Denis | F01D 5/027 416/144 |
| 2012/0148401 A1 | 6/2012 | Kulathu et al. | |

OTHER PUBLICATIONS

Universite McGill, Laboratoire de dynamique des structures et vibrations; Dynamic Analysis of Non-Straight Rotors; Dec. 3, 2013 [Retrieved from Internet: structdynviblab.mcgill.ca/recherche.html].

* cited by examiner

| | X | | | | | | | | |
|---|---|---|---|---|---|---|---|---|---|
| | -15 | -13.8 | -12 | -10 | -7.5 | -5 | -2.5 | 0 | Y |
| 2ND | 5.9 | 6.4 | 6.9 | 7.1 | 7.1 | 7.1 | 7.4 | 7.8 | |
| 3ND | 21.8 | 26.7 | 32.5 | 34.3 | 31.1 | 26.4 | 21.8 | 23.3 | |
| 0ND | | | | | | | | 11 | |
| 4ND | 26.2 | 30.9 | 36.1 | 35.4 | 28.8 | 23.4 | 14.5 | 10.5 | |
| 1ND | 12 | 13.2 | 14.8 | 14.6 | 11.4 | 9.3 | 9.4 | | |
| 5ND | 36.9 | 34.8 | 32.7 | 28.3 | 21 | 15.7 | 9 | 19.4 | |

FIG. 12

ND DESCRIPTION OF THE PAGE BELOW:

COMPONENTS RESISTANT TO TRAVELING WAVE VIBRATION AND METHODS FOR MANUFACTURING THE SAME

TECHNICAL FIELD

The present invention generally relates to traveling wave vibration of rotationally periodic (i.e., cyclically symmetric) components, and more particularly relates to components resistant to traveling wave vibration and methods for manufacturing the same.

BACKGROUND

A traveling wave is a type of vibration where a mechanical disturbance (wave) propagates continuously along the circumference of a rotationally periodic (i.e., cyclically symmetric) component. The rotationally periodic component may be a rotatable or a stationary component. The propagation speed of the wave relative to the component is a characteristic of the frequency and the wavelength. The excitation source for the traveling wave can be from unsteady fluid dynamic forces on the component or from mechanical interaction of various components coupled to the component. A defining characteristic of a traveling wave is the existence of two natural frequencies (eigenvalues) equal in value with the corresponding mode shapes (eigenvectors) similar but shifted in phase. The term "mode shape" refers to the deflected shape of the component corresponding to a given natural frequency. The term "mode" is shorthand for "natural mode" and refers collectively to a particular eigenvalue and its eigenvector(s). Thus, a component responding to resonant excitation of a traveling wave vibrates at a certain natural frequency and attains a deflected shape forming a continuous wave around its circumference, propagating at a specific speed relative to the component.

For example, traveling wave vibration in turbomachinery rotors (an exemplary "rotationally periodic rotatable component") commonly involve disc traveling wave responses. Traveling waves propagate within the disc independent of the rotational speed of the turbomachinery rotor and induce harmonic alternating stresses in both the disc and blades thereof. When the elastic deformations (deflection) are mainly in the disc, the deflecting modes are called disc modes. Disc modes are in contrast to blade modes where the disc deflections become small compared with those of the blades. For the conventional axi-symmetrical circular disc, many of the natural disc modes are, in theory, in pairs with identical frequencies and similar, spatially orthogonal mode shapes, each with n equi-spaced nodal diameters, n being an integer. Thus, the conventional rotationally periodic component has inherently many natural frequencies and associated mode shapes. In the case of a disc, the mode shapes have been described in terms of its nodal diameters (ND). The practical consequence of this is that, with traveling wave excitation at or near a natural frequency, the node lines are not fixed with respect to the disc but propagate around the disc at the characteristic wave speed. At no point during the vibration cycle is the complete disc quiescent. Consequently, as the disc vibrates, the undesirable harmonic alternating stresses are induced in the rotationally periodic component, parts thereof, and/or the turbomachine.

Hence, there is a need for components resistant to traveling wave vibration and methods for manufacturing the same. There is also a need for systematically reducing traveling wave vibration of rotationally periodic components.

BRIEF SUMMARY

Methods are provided for manufacturing a component resistant to traveling wave vibration. In accordance with one exemplary embodiment, the method comprises identifying, in a model of a rotationally periodic component, one or more modes thereof that deflect in excess of a threshold deflection limit in response to a traveling wave excitation. Each mode of the one or more modes has a pair of repeated eigenvalues associated therewith. An asymmetry pattern is determined that separates each pair of repeated eigenvalues by a desired frequency split. A plurality of features are formed and disposed according to the asymmetry pattern about a component body to define an asymmetrical component comprising the component resistant to traveling wave vibration.

Methods are provided for manufacturing a component resistant to traveling wave vibration in accordance with yet another exemplary embodiment of the present invention. The method comprises the steps of obtaining data relating to a vibration response of a model of a rotationally periodic component. One or more targeted modes of the rotationally periodic component that exceed a threshold deflection limit are selected. The one or more selected modes are analytically modeled with an analytical model. An asymmetry pattern is determined that separates each pair of repeated eigenvalues associated with each of the one or more modes by a desired frequency split. The step of determining the asymmetry pattern comprises applying a proposed asymmetry pattern to the analytical model and analyzing the analytical model to determine if the proposed asymmetry pattern results in the desired frequency split for each pair of repeated eigenvalues associated with each of the one or more modes. If the proposed asymmetry pattern does not result in the desired frequency split, the applying and analyzing steps are repeated until the proposed asymmetry pattern results in the desired frequency split. The proposed asymmetry pattern resulting in the desired frequency split comprises the asymmetry pattern. Material is added to and/or removed from a component body according to the asymmetry pattern to define an asymmetrical component comprising the component resistant to traveling wave vibration.

Components resistant to traveling wave vibration manufactured by the methods are also provided in accordance with another exemplary embodiment of the present invention. The component comprises a component body and a plurality of features disposed about the component body according to an asymmetry pattern that separates each pair of repeated eigenvalues associated with a targeted mode that deflects in excess of a threshold deflection limit in response to a traveling wave excitation.

Furthermore, other desirable features and characteristics of the components resistant to traveling wave vibration and methods for manufacturing the same will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to components resistant to traveling wave vibration and methods for manufacturing the same. Any rotationally periodic (i.e., cyclically symmetric) component, including a disc of a turbomachine, can vibrate at a certain natural frequency and attain a deflected shape in the form of a traveling wave under certain forms of external excitation. A "rotationally periodic component" comprises an integer number of identical substructures circumferentially dispersed about an axis forming a closed loop. As noted above, the rotationally periodic component is cyclically symmetric. The rotationally periodic component may be a rotatable component or a stationary component. The traveling wave is in response to a specific excitation force, so the component responds in the form of the traveling wave. As noted previously, a traveling wave is a type of vibration where the mechanical disturbance (wave) propagates continuously along the circumference of the component. The propagation speed of the wave relative to the component is a characteristic of the frequency of vibration and the wavelength. The excitation source for the traveling wave can be from unsteady fluid dynamic forces on the component or from mechanical interaction of various components coupled to the component. A defining characteristic of a traveling wave is the existence of two natural frequencies (eigenvalues) equal in value (referred to herein as "natural frequency pairs") with the corresponding mode shapes (eigenvectors) similar but shifted in phase. The traveling wave propagates due to the axiom that any linear combination of the basis eigenvectors is itself an eigenvector, thus making possible an infinite, continuous and periodic progression of eigenvectors that comprise a wave motion. "Natural frequency" is the frequency at which a structure tends to vibrate in the absence of external excitation forces. At this frequency, the structure offers the least resistant to an excitation. The condition where the excitation frequency equals the natural frequency is called "resonance". The term "mode shape" refers to the deflected shape of the component corresponding to a given natural frequency. The term "mode" is shorthand for "natural mode" and refers collectively to a particular eigenvalue and its eigenvector(s). Thus, a rotationally periodic component responding to resonant excitation of a traveling wave vibrates at a certain natural frequency and attains a deflected shape forming a continuous wave around its circumference, propagating at a specific speed relative to the component. The deflected shape of the rotationally periodic component can take one of several forms commensurate with the excitation, namely a forward traveling wave (wave propagates in the direction of rotation for a rotationally periodic rotatable component), a backward traveling wave (wave propagates in the opposite direction of rotation for a rotationally periodic rotatable component), or a standing wave (forward and backward waves combine to produce a nodal pattern (as hereinafter described) stationary relative to the rotatable component). For a periodically symmetric stationary component (e.g., a stator), the wave propagates in a clockwise or counterclockwise direction. When the elastic deformations (deflection) are mainly in the disc, the deflecting modes are called disc modes. In the case of a disc, the mode shapes have been described in terms of it nodal diameters. Each pair of repeated eigenvalues (natural frequency pairs) is associated with a specific nodal diameter. The term nodal diameter is derived from the appearance of a circular geometry, like a disc, vibrating in a certain mode with continuous regions of zero displacement (nodes) extending from a point on the periphery, through the disc center, to a point 180 degrees opposite. The locus of each region of zero displacement is called a nodal diameter. In the simplest case, this node region forms a straight line across the diameter of the disc. For a given mode, the number of nodal diameters is equal to the wave number (number of complete waves developed around the circumference) and is greater than or equal to zero.

While the advantages of the present invention as described herein will be described with respect to a bladed disc (an exemplary rotor) in a turbomachine, the teachings of the present invention are generally applicable to other rotationally periodic (i.e., cyclically symmetric) components including rotationally periodic rotatable components and rotationally periodic stationary components that are susceptible to traveling wave vibration. The rotationally periodic component may or may not be part of a turbomachine. Exemplary rotationally periodic rotatable components include an unbladed disc of a turbomachine, a turbine, a compressor, a fan, a gear, etc. The "turbomachine" may be, for example, a propulsion engine, a turbocharger, a pump, a fan, etc. Turbomachines are used in myriad applications, including in air turbine starters used in aircraft engines.

Figure 1:
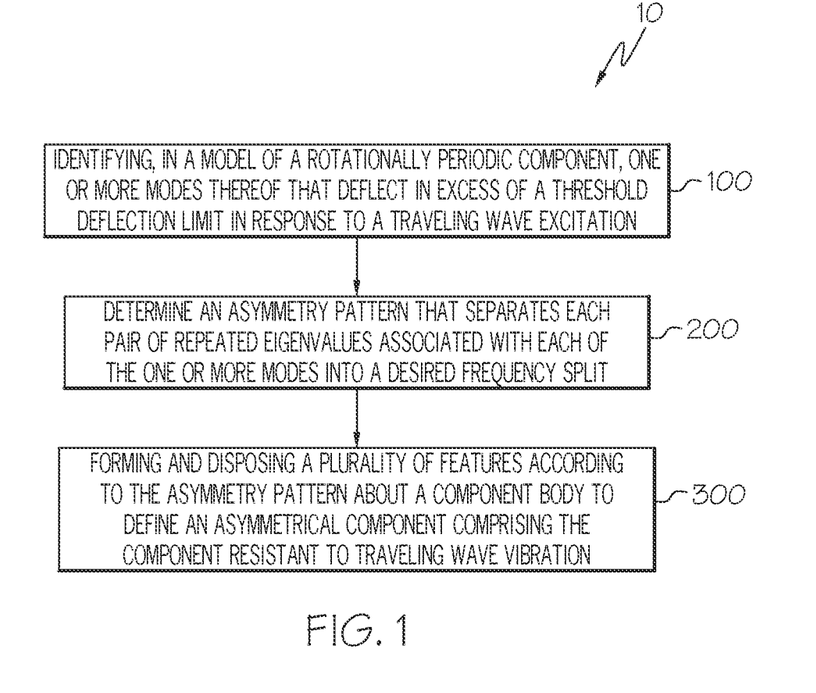
FIG. 1 is a flow chart of a method for manufacturing a component resistant to traveling wave vibration, in accordance with exemplary embodiments of the present invention.
Figure 2:
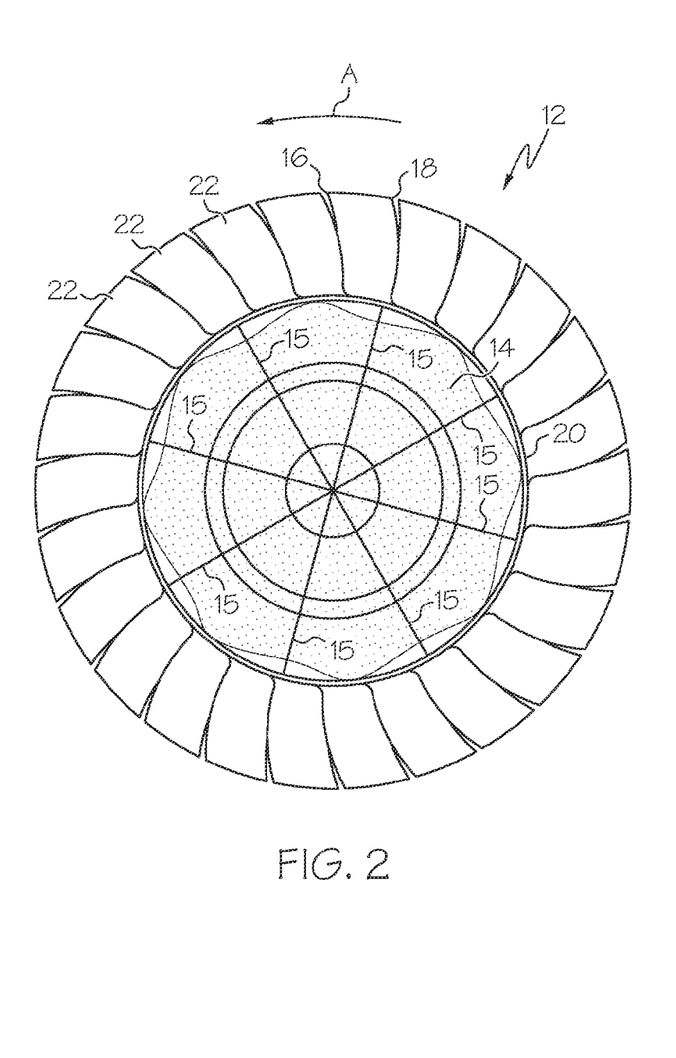
FIGS. 2 and 3 are front views of a conventional symmetrical bladed disc with an exemplary 4ND (nodal diameter) mode shape (also known as a "mode shape plot")
Figure 3:
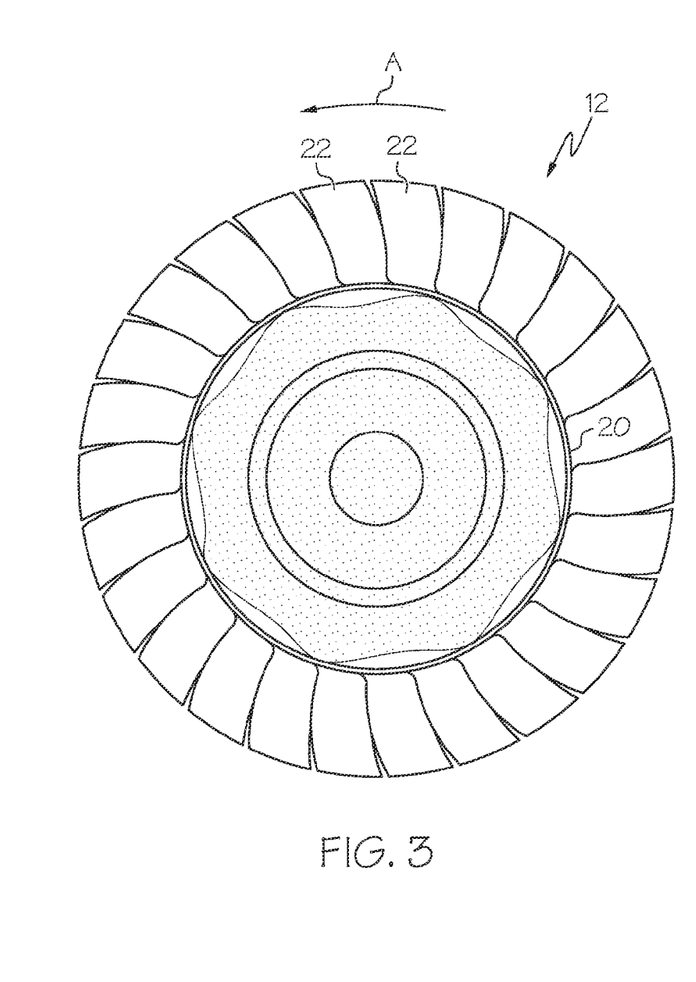

Referring to FIG. 1, in accordance with exemplary embodiments of the present invention, a method 10 for manufacturing a component resistant to traveling wave vibration begins by identifying, in a model of a rotationally periodic (i.e., cyclically symmetric) component such as the bladed disc 12 of FIGS. 2 and 3, one or more modes thereof that deflect in excess of a threshold deflection limit in response to a traveling wave excitation (step 100). As used herein, the term "traveling wave excitation" means excitation of a traveling wave by unsteady fluid dynamic forces on the rotationally periodic component or from mechanical interaction of various components coupled to the rotationally periodic component. FIGS. 2 and 3 are each front views of an exemplary bladed disc 12 (a rotationally periodic rotatable component). The bladed disc has an overall construction and operation that is generally understood by persons skilled in the art. In general terms, the bladed disc 12 and an unbladed disc (not shown) each comprise a component body 14 (a rotatable body in the case of the exemplary rotationally periodic rotatable component) and a rim 20 disposed about a periphery of the rotatable body 14. The rotatable body 14 has a front side (an obverse side) and a back side (a reverse side). The bladed disc 12 includes a plurality of blades 22 each having a leading edge 16 and a trailing edge 18. The leading and trailing edges refer to blades in the context of airflow direction. The plurality of blades are arranged circumferentially around the rim of the rotatable body. The number of blades is referred to herein as a "blade count." The bladed discs 12 depicted in FIGS. 2 and 3 each have an exemplary blade count of 26. The rim 20 is normally continuous and has a uniform thickness in the conventional bladed disc and unbladed disc. The bladed disc may include blades 22 integrally formed with the rotatable body 14, from a single piece of disc material (a "blisk") as depicted in FIGS. 2 and 3 or each blade of the plurality of blades may be separate from and inserted into slots in the rotatable body (an "inserted blade design") (not shown). For example, the blades may be attached to the rim of the rotatable body by means of contoured blade roots that dovetail into cooperating slots in the disc. For a turbine, the blades 22 are spaced apart and positioned such that the disc rotates when a pressure differential is created across the two sides thereof. For a compressor or fan, shaft torque causes rotation creating a pressure differential. The model may be a full size or scale model of the rotationally periodic component. The full size model may be an actual rotationally periodic component. Thus, the rotationally periodic rotatable component depicted in FIGS. 2 and 3 may be considered a "model of a rotationally periodic component."

Identifying the one or more modes that deflect in excess of a threshold deflection limit in response to a traveling wave excitation involves measuring the vibration response of the model of the rotationally periodic component to the traveling wave excitation. The identification may be made during vibration testing using, for example, strain gauges or a Non-Intrusive Stress Measurement System (NSMS) available from, for example, Agilis Measurement Systems of Palm Beach Gardens, Fla. Measurements of the mechanical response of various mode shapes are collected to quantify the deflection to determine if the deflection is in excess of the threshold deflection limit. The threshold deflection limit may be determined by the component designer or the like. The modes that deflect in excess of the threshold deflection limit in response to the traveling wave excitation (also referred to herein as "problematic modes" and "targeted modes") present a vibration risk to the rotationally periodic components to be manufactured. While identification of the problematic modes during design testing using particular methods has been described, it is to be understood that identification of the problematic modes may occur using other methods and during other design phases. In addition, a problematic mode may be identified after the rotationally periodic component has already been manufactured as hereinafter described.

The identifying step 100 includes obtaining data relating to a vibration response of the model of the rotationally periodic component. The data indicates which modes are deflecting, quantifies the deflection, where the deflection (i.e., stress) is occurring, frequencies, and nodal diameters (in the case of a disc). The data is processed and compared to fatigue properties, as certain deflection provides a certain amount of stress. If the deflection exceeds the threshold deflection limit, the one or more problematic modes are then targeted to separate or split the natural frequency pairs (the eigenvalues) at that mode, as hereinafter described. The one or more problematic modes are targeted because the one or more modes deflect in excess of the predetermined threshold deflection limit in response to the traveling wave excitation.

Still referring to FIGS. 2 and 3, the conventional bladed disc 12 (an exemplary rotationally periodic rotatable component) with an exemplary 4ND (nodal diameter) mode shape at a natural frequency pair of about 7685 Hertz (Hz) is depicted. Thus, for the depicted bladed disc, a 4ND mode backward traveling wave (i.e., the wave propagates in the opposite direction of component rotation) at a frequency of about 7685 Hz would have been identified in step 100. In FIGS. 2 and 3, the conventional bladed discs 12 rotate counterclockwise as indicated by the direction of the arrows A therein. The shaded contours across the disc in the mode shape plots of FIGS. 2 and 3 represent a simplified depiction of out-of-plane displacement contours, wherein four complete waves (4ND) can be seen along the circumference and the diametral lines represent the nodal diameters 15. As explained earlier, nodal diameters are lines of zero out-of-plane displacement that cross the entire disc. The displacement, for example, of the disc shows a sinusoidal characteristic over the circumference where the peaks are the out of plane motion. There can be as few as zero nodal diameters where the entire circumference of the disc vibrates in phase.

For the bladed discs depicted in FIGS. 2 and 3, in which the blade count is 26 blades, there are 14 distinct sets of nodal diameters (i.e., blade count/2+1 for an even blade count and (blade count+1)/2 for an odd blade count) and any nodal diameter from 0 to infinity will fall into one of these sets.

Referring again to FIG. 1, the method 10 for manufacturing a component resistant to traveling wave vibration continues by determining an asymmetry pattern that separates each pair of repeated eigenvalues associated with each of the one or more problematic modes into a desired frequency split (step 200). The algebraic difference between the pair of repeated eigenvalues is referred to herein as a "frequency split." The desired frequency split may be predetermined subjectively by an iterative process or it may be possible to analytically predetermine the desired frequency split(s). Introducing asymmetry to the normally rotationally periodic component disrupts the periodic symmetry and changes the eigenstructure thereof, whereby the formerly repeated frequency pairs associated with the one or more targeted modes are now distinct. The frequency splits for each mode shape will generally be different and are a function of the asymmetry pattern. Optimization techniques can be exploited to define the asymmetry pattern that will effectively separate into the desired frequency split selected (targeted) modes (also known as targeted nodal diameters) that have been identified in step 100. The asymmetry pattern can be determined, for example, by superimposing optimal patterns for each of the one or more targeted modes. For example, the asymmetry patterns determined for each of FIGS. 5 and 7 through 9 were made by superimposing three different patterns, one each for 3ND, 4ND, and 5ND mode shapes.

The asymmetry pattern itself may be determined by trial and error manually or by automation using numerical optimization techniques such as, for example, iSight® optimization software available from Dassault Systemes, France). The asymmetry pattern comprises a plurality of features 124 (e.g., protrusions, bosses, cuts, etc.) arranged in an asymmetrical pattern about the rotationally periodic component as hereinafter described. The cuts may define the protrusions, bosses, or other projections when material is removed or the protrusions, bosses, or other projections may be formed by adding material to the model. The decision to use a particular feature (e.g., protrusions as opposed to another feature type) depends upon certain physical and programmatic constraints. Using conventional finite element analysis techniques, one or more targeted modes are analytically modeled. Depending on the nature of the asymmetry, the modal analysis may require the use of a full model, e.g., a model embodying a complete disc with all blades. This contrasts with a typical modal analysis of a rotor wherein only a sector of the rotor, comprising a single blade and its portion of the disc, is modeled with behavior of the other, non-modeled sectors represented mathematically using well-known analytical techniques, i.e., modal cyclic symmetry. Finite element models may be used to investigate vibration responses under running conditions by predicting vibratory natural frequencies, mode shapes, and vibratory stresses. A continuous structure has an infinite number of degrees of freedom (DOF). The finite element method approximates the real structures with a finite number of DOFs. Based on the boundary conditions, the model will predict natural frequencies and mode shapes. By using modal analysis, the natural frequencies and mode shapes of the entire structure for the targeted one or more modes may be obtained. The proposed asymmetry pattern is applied to the analytical model and analyzed to determine if the desired frequency split(s) result.

As noted above, the asymmetry pattern is determined by trial and error or by automation, using the modal analysis techniques to easily test whether the proposed asymmetry pattern results in the desired frequency split. For exemplary bladed discs, the asymmetry pattern will depend, in part, upon the blade count thereof. Modal analysis takes the blade count into consideration. If the modal analysis measurements of the rotationally periodic component with the proposed asymmetry pattern do not result in the desired vibratory response (i.e., the desired frequency split for each of the one or more targeted modes), the applying and analyzing steps are repeated until the proposed asymmetry pattern results in the desired frequency split as determined and validated by modal analysis. The proposed asymmetry pattern resulting in the desired asymmetry split comprises the asymmetry pattern for the component(s) resistant to traveling wave vibration to be manufactured. The asymmetry pattern effectively separates selected (targeted) modes (also known as targeted nodal diameters).

Figure 4:
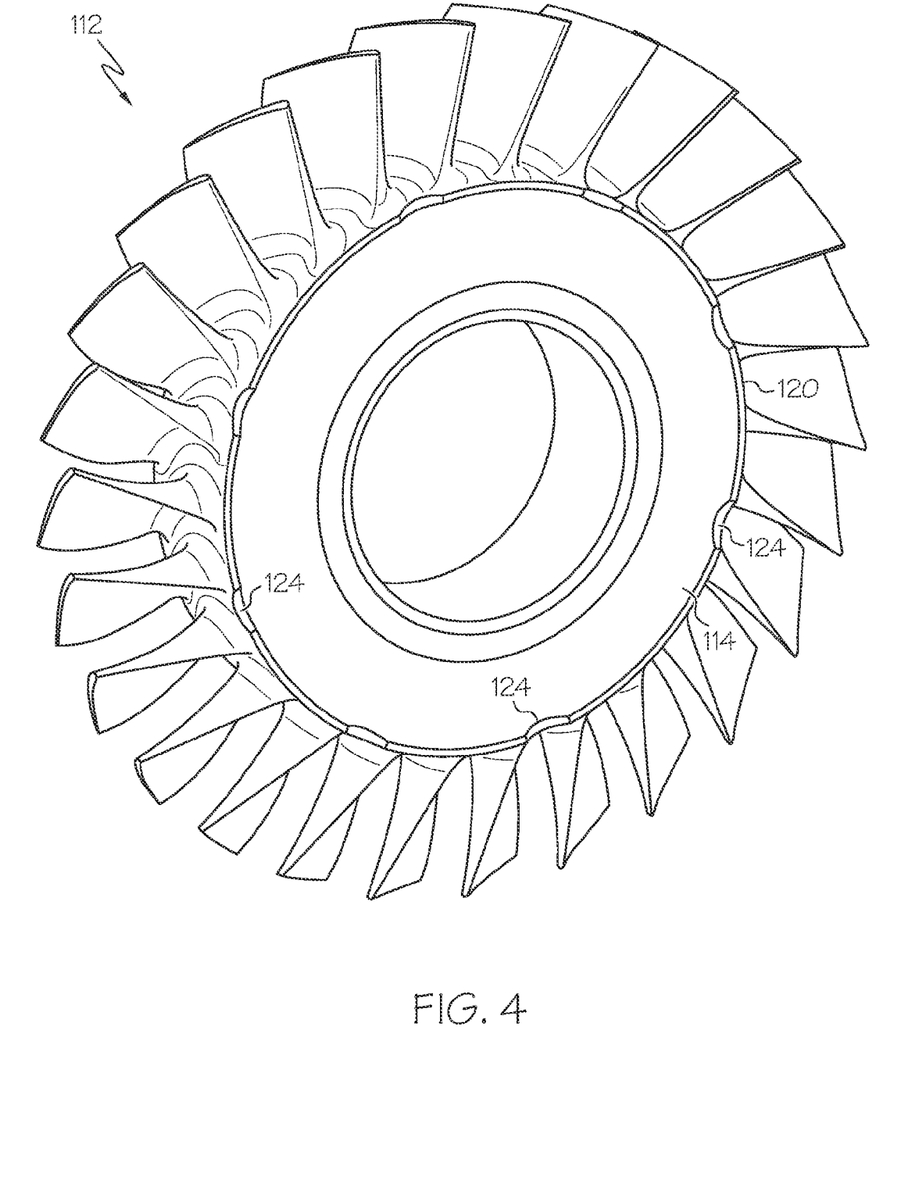
FIG. 4 is an isometric view of an exemplary asymmetrical bladed disc resistant to traveling wave vibration according to exemplary embodiments of the present invention, the exemplary asymmetrical bladed disc having unequally-spaced scallop cuts around a rim thereof according to an exemplary asymmetry pattern that separates the natural frequency pair associated with a four nodal diameter (4ND) mode shape.
Figure 5:
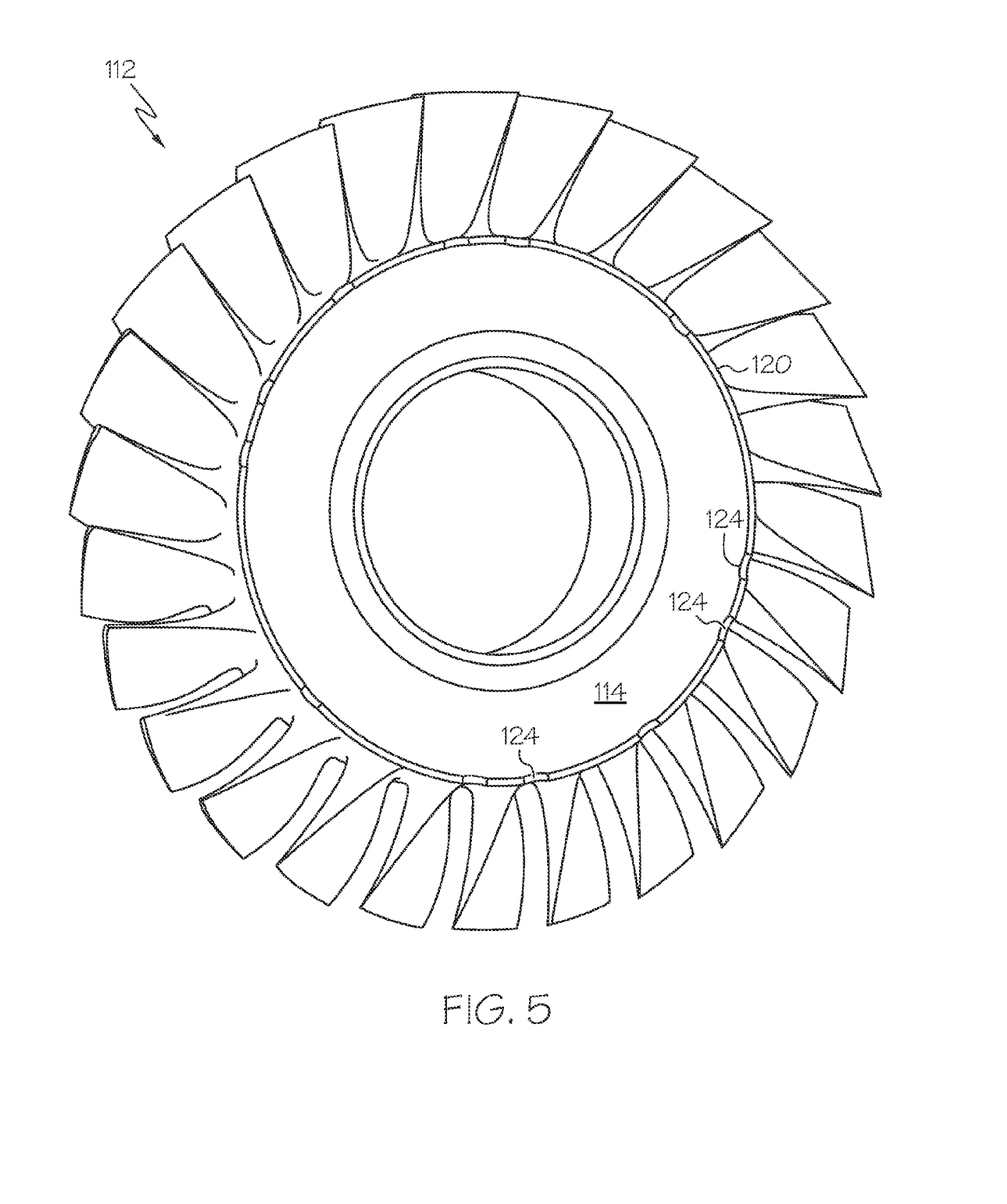
FIG. 5 is an isometric view of another exemplary asymmetrical bladed disc resistant to traveling wave vibration according to another exemplary embodiment of the present invention, the exemplary asymmetrical bladed disc having unequally-spaced scallop cuts around a rim thereof according to another exemplary asymmetry pattern that separates the natural frequency pairs associated with 3ND, 4ND, and 5ND mode shapes.

Still referring to FIG. 1, and now to FIGS. 4 through 12, the method 10 for manufacturing a component resistant to traveling wave vibration continues by forming and disposing the plurality of features according to the asymmetry pattern about a component body 114 to define an asymmetrical component (exemplified by asymmetrical bladed disc 112) comprising the component resistant to traveling wave vibration (step 300). The plurality of features 124 may be defined in the component body 114 by at least one of adding or removing material from discrete regions thereof according to the asymmetry pattern determined in step 200. For example, if the rotationally periodic component comprises a disc (a bladed disc or an unbladed disc), disc material may be removed from the component body comprising a rotatable body by milling or other machining methods and/or disc material may be added via casting or similar technique (e.g., material may be added in some area(s) and removed from other area(s). For example, FIGS. 4 through 6B depict the asymmetrical rotatable component (exemplary asymmetrical bladed disc 112) manufactured by removing disc material from a rim 120 of the rotatable body 114 to form unequally spaced scallop cuts (exemplary features 124) on the rim to introduce asymmetry to the formerly rotationally periodic (i.e., cyclically symmetric) component and separate the natural frequency pair associated with a 4ND mode shape (FIG. 4) or the natural frequency pairs associated with 3ND, 4ND, and 5ND mode shapes (FIG. 5). The asymmetry pattern depicted in FIG. 5 is comprised of three different patterns superimposed on each other, one pattern for each of 3ND, 4ND, and 5ND. FIGS. 7 through 11 depict different views of an asymmetrical rotatable component manufactured by cutting around the rim to define an asymmetry pattern of bosses or protrusions (exemplary features 124) (thicker area) on the rim to define a rim having a non-uniform thickness and introduce asymmetry to separate the natural frequency pairs associated with 3ND, 4ND, and 5ND mode shapes. The asymmetry pattern depicted in FIGS. 7 through 11 is also comprised of three different patterns superimposed on each other, one pattern for each of 3ND, 4ND, and 5ND. The thinner areas of the rim are the original axi-symmetric geometry. While FIGS. 4 through 5 depict the asymmetry pattern on only one side of the asymmetrical bladed disc, it is to be understood that the asymmetry pattern may be formed and disposed on both sides (the front side and a back side) of the asymmetrical bladed disc. Thus, the asymmetry pattern may be formed and disposed on the front side (the leading edge side), the back side (the trailing edge side), or both the front and back sides of the component body 114 to define the asymmetrical component. The asymmetry pattern and/or the features themselves on the front side may be the same or different from the asymmetry pattern and/or features on the back side. While the plurality of features 124 are depicted as formed in the rim 120 of the asymmetrical bladed discs 112 of FIGS. 4 through 11, it is to be understood that the plurality of features may be formed and disposed anywhere about the component body 114 to provide asymmetry thereto, thereby separating the natural frequency pairs of each of the targeted modes to the desired frequency split. It is also to be understood that the plurality of features may be unequally spaced, equally spaced, or both unequally spaced in some regions of the component body and equally spaced in other regions.

Figure 6A:
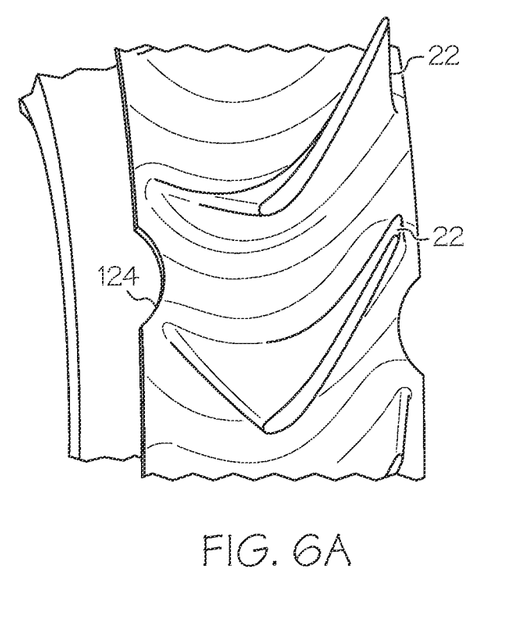
FIGS. 6A and 6B are enlarged top views of a portion of the exemplary asymmetrical bladed disc of FIG. 4 or FIG. 5, illustrating one of the scallop cuts as part of a first asymmetry pattern on the front side (leading edge) (FIG. 6A) angularly offset from a scallop cut as part of a second asymmetry pattern on the back side (trailing edge) (FIG. 6B)
Figure 6B:
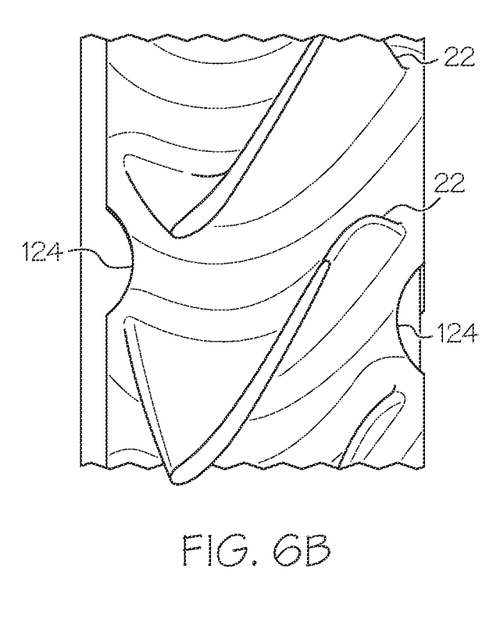
Figure 7:
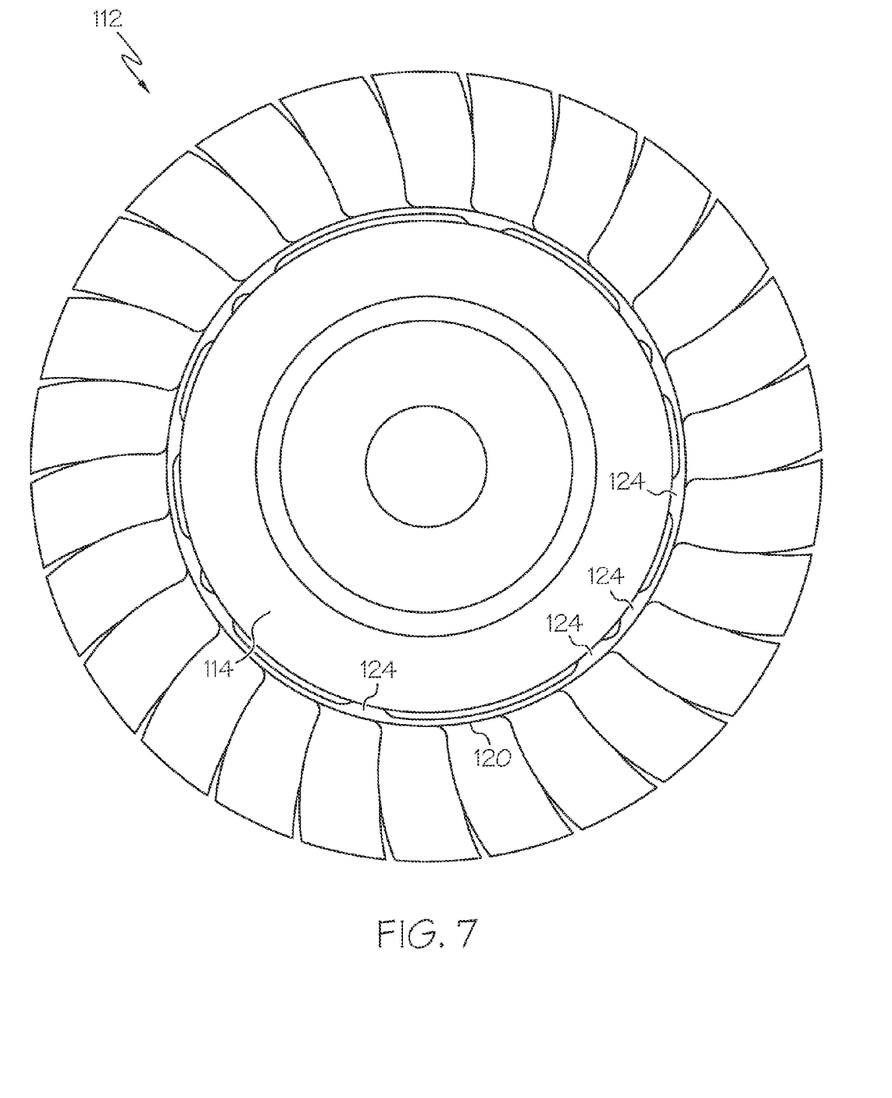
FIGS. 7 through 9 are front, isometric, and close-up views respectively of another exemplary asymmetrical bladed disc resistant to traveling wave vibration according to exemplary embodiments of the present invention, the exemplary asymmetrical bladed disc having cuts around the rim thereof defining a complex asymmetry pattern of bosses or protrusions on the rim to separate the natural frequency pairs associated with 3ND, 4ND, and 5ND mode shapes.
Figure 8:
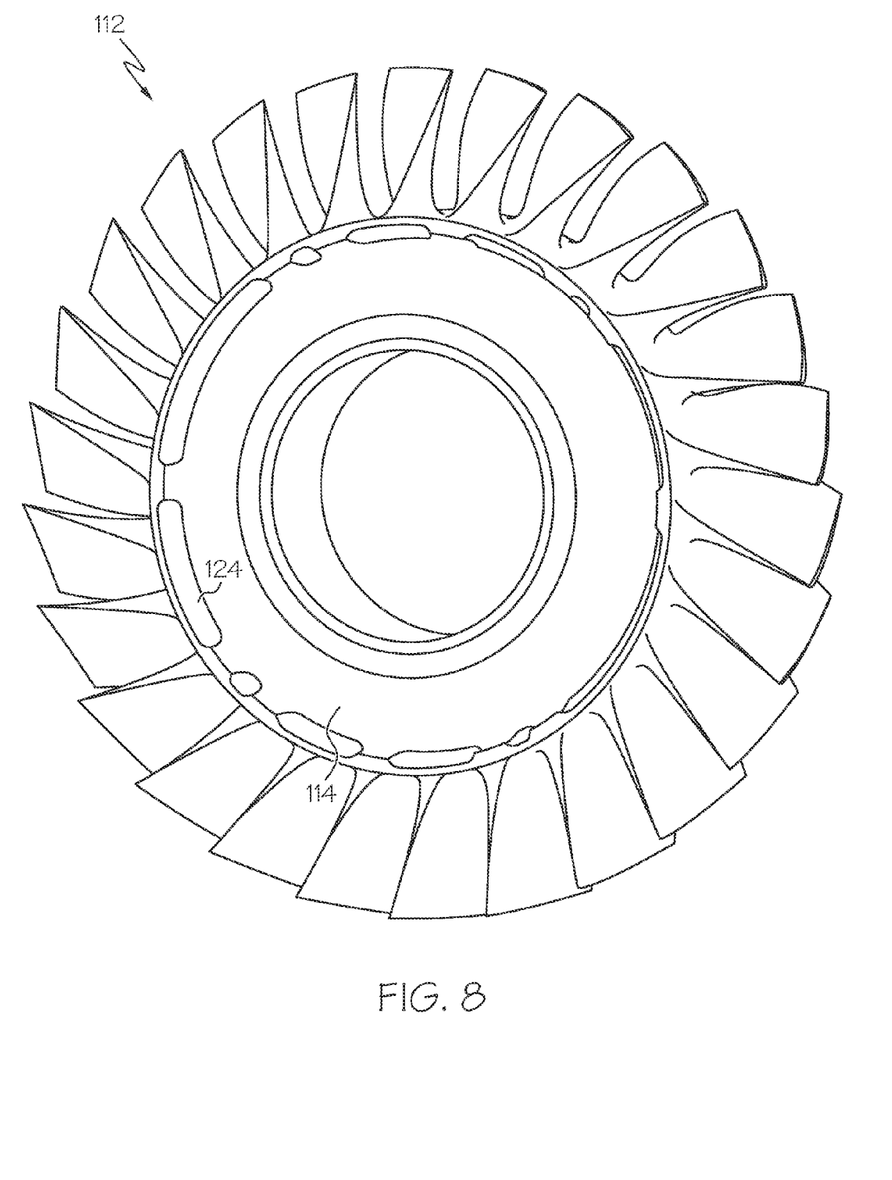
Figure 9:
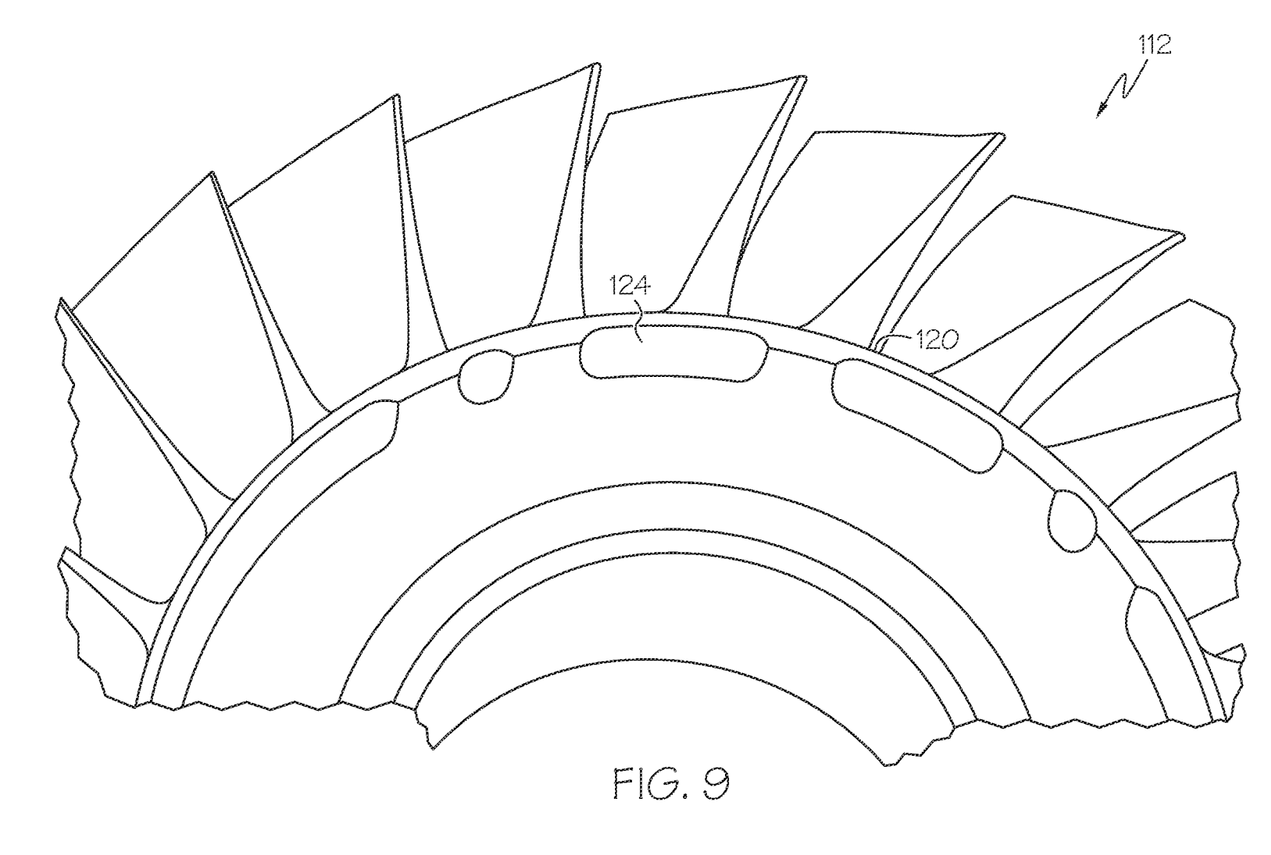

Referring now specifically to FIGS. 6A and 6B, the asymmetry patterns may be shifted between the front and back sides of the rotatable body (i.e., the offset angle may be changed). For example, the asymmetry pattern of the asymmetrical bladed disc of FIGS. 6A and 6B comprises a plurality of scallop cuts (exemplary features 124) defined in the rim 120 of the asymmetrical bladed disc 112 on both the front and back sides (a single scallop cut on each side is depicted for ease of illustration). As used herein, the term "offset angle" means that the asymmetry pattern on the front side is angularly displaced by a desired amount relative to the asymmetry pattern on the back side and the asymmetry patterns on either the front side or the back side are angularly displaced by a desired amount from one of the blades. In other words, the asymmetry is precisely placed on either side with respect to one of the blades. In the case of a bladed disc, the leading edge offset angle (A) and the leading edge/trailing edge pattern offset angle (B) may be analytically determined to position the leading edge pattern relative to the blade root (if blades are present) and locate the trailing edge pattern relative to the leading edge pattern. Two degrees of freedom are thus provided by shifting the leading edge pattern relative to the blade root and shifting of the asymmetric pattern at the trailing edge relative to the asymmetric pattern at the leading edge. Therefore, the asymmetric patterns, the offset angles thereof, or both may differ between the leading and trailing edges of the asymmetrical bladed disc. The same asymmetry pattern shifting may occur between the front and back sides of the component body 114 of an asymmetric component other than an asymmetrical bladed disc.

Figure 10:
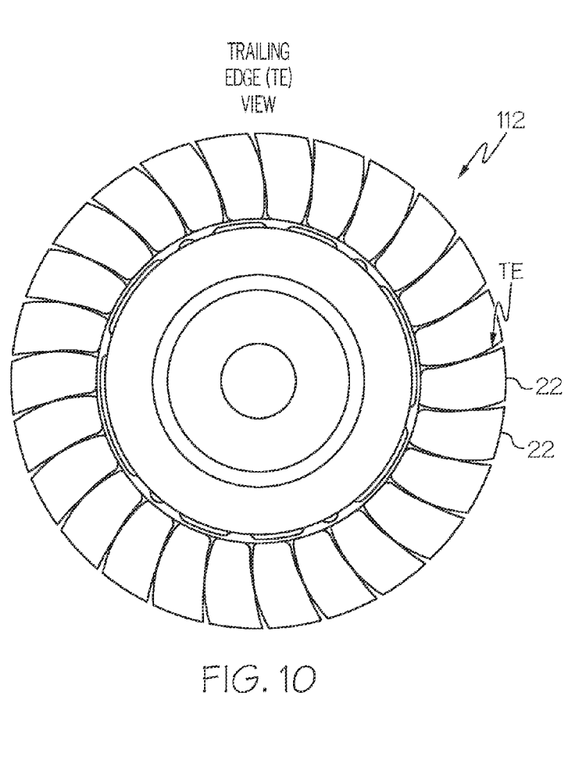
FIGS. 10 and 11 are views of the front and back sides of the asymmetrical bladed disc resistant to traveling wave vibration of FIGS. 7 through 9, the leading edge offset angle A (offset angle A not shown for ease of illustration) at an exemplary 17° and the LE/TE pattern offset angle B (offset angle B not shown for ease of illustration) at an optimized 12° to separate each of the natural frequency pairs associated with the 3ND, 4ND, and 5ND mode shapes to a desired frequency split as shown in the accompanying table (i.e., the table shows the analytically determined split frequencies for various nodal diameters as a function of the offset angle) (the LE/TE pattern offset angle B identified in row X and the frequency splits identified in rows Y)
Figure 11:
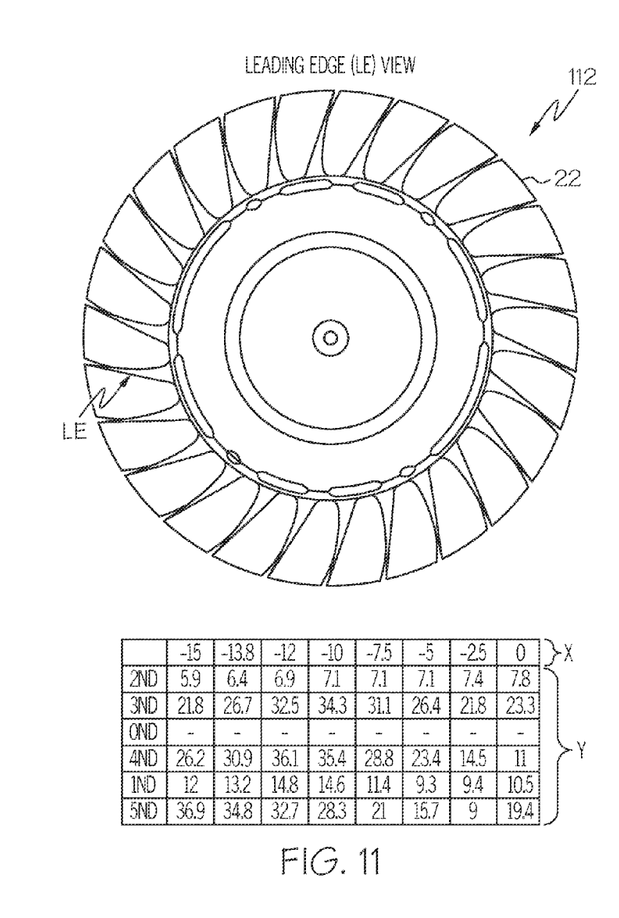
Figure 12:
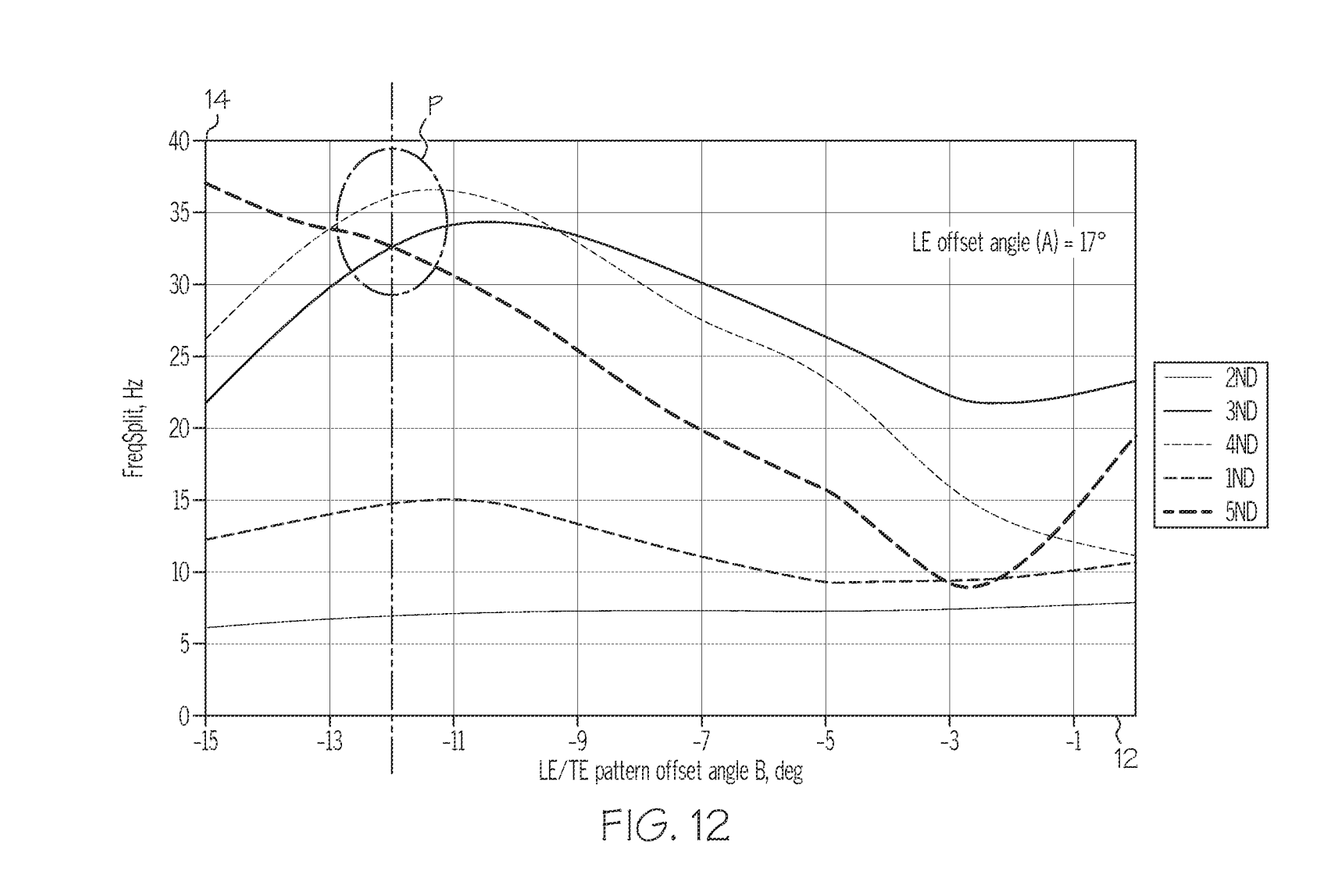
FIG. 12 is a graphical representation of the effect on the frequency split (Hz) of the 1 through 5 nodal diameter modes of the asymmetrical bladed disc of FIGS. 7 through 11, the optimum frequency split at a LE/TE pattern offset angle B of −12°.

Referring again to FIGS. 7 through 12, trailing and leading edge views (FIGS. 10 and 11) of the sides of the asymmetrical bladed disc 112 of FIGS. 7 through 9 are depicted along with a graphical representation in FIG. 12 of the effect on the frequency split (Hz) of changing the leading edge/trailing edge offset angle B at a defined leading edge offset angle A (i.e., FIG. 12 is a plot of the information in the table accompanying exemplary FIGS. 10 and 11). As noted previously, offset angle A (not shown for ease of illustration) is the angular location of the pattern on the leading edge side of the rim relative to the leading edge of a particular blade. Offset angle B is the angular offset between the patterns on the trailing edge side and the leading edge side of the rim. FIGS. 10 and 11 show that the leading edge and trailing edge rims have the same pattern, but one is shifted circumferentially from the other (i.e., clocked) by the offset angle. The table accompanying FIGS. 10 and 11 and the graph in FIG. 12 show the variation in frequency split for the 1-5 ND modes as a function of offset angle B, holding offset angle A constant. The actual pattern geometry (protrusion size and spacing between successive protrusions) is also held constant. The leading edge/trailing edge pattern offset angle B is represented by degrees along x-axis 12 and the frequency split represented by Hz along y-axis 14 of FIG. 12. The different lines each represent a particular nodal diameter (identified in FIG. 12). FIG. 12 shows that at a leading edge offset angle A of 17°, the optimum offset angle B is at point P where the 3ND, 4ND, and 5ND lines converge. The 3ND, 4ND, and 5ND modes were previously identified as presenting vibration risk to the model of the symmetrical bladed disc. The split of the frequencies for 3ND, 4ND, and 5ND respectively is greater than 30 Hz at the leading edge offset angle A of 17° and a leading edge/trailing edge offset angle B of −12° (i.e., the trailing edge pattern is shifted 12 degrees relative to the leading edge pattern). The "optimum" offset angle results in the largest frequency splits for all three targeted modes. While 3ND, 4ND, and 5ND modes are described as exemplary targeted modes, it is to be understood that fewer, additional, or other modes that deflect in excess of a threshold deflection limit in response to a traveling wave excitation may be targeted. It is also to be understood that FIGS. 7 through 12 are exemplary only.

The same asymmetry pattern may be used about each component body 114 (the rotatable body in the case of a rotatable component) of a plurality of component bodies of a plurality of asymmetrical components, to systematically and repeatedly reduce traveling wave vibration in the manufactured components resistant to traveling wave vibration. The asymmetrical component may be mass produced off of a drawing, such as an engineering drawing. The asymmetry pattern is defined on the engineering drawing and, within normal dimensional tolerances, each asymmetrical component made to conform to the drawing will have an identical asymmetry pattern. Alternatively, the asymmetrical components could have similar but not identical patterns where the mass produced pattern is fine-tuned to adjust the split frequency as part of the production process.

While the steps of identifying one or more problematic modes, determining an asymmetry pattern that separates each pair of repeated eigenvalues by a desired frequency split, and the forming and disposing a plurality of features are described as occurring during manufacture of a component resistant to traveling wave vibration, it is to be understood that traveling wave vibration may not be discovered until after a component has already been manufactured. In this instance, material may be removed from the existing component to form and dispose a plurality of features according to an asymmetry pattern determined according to modal analysis as previously described. The possible options available to introduce asymmetry to the existing component may be more limited than when done during manufacture. Introducing asymmetry to the existing component also results in the component resistant to traveling wave vibration according to exemplary embodiments of the present invention.

Accordingly, components resistant to traveling wave vibration and methods for manufacturing the same are provided. Components resistant to traveling wave vibration, both rotatable and stationary components, including the exemplary asymmetrical bladed discs, feature asymmetric patterns that reduce potentially harmful traveling wave vibration. The asymmetry of the component disrupts its conventional periodic symmetry, thereby reducing the traveling wave vibration response.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for manufacturing a component resistant to traveling wave vibration, the component comprising a component body having a front side and a back side and the method comprising the steps of:
    identifying, in a model of a rotationally periodic component, one or more modes thereof that deflect in excess of a threshold deflection limit in response to a traveling wave excitation, each of the one or more modes having a pair of repeated eigenvalues associated therewith;
    determining an asymmetry pattern that separates each pair of repeated eigenvalues by a desired frequency split; and
    forming and disposing a plurality of features according to the asymmetry pattern about a circumference of the front side of the component body and about a circumference of the back side of the component body, the asymmetry pattern on the front side shifted circumferentially from the asymmetry pattern on the back side by an offset angle to define an asymmetrical component comprising the component resistant to traveling wave vibration.

2. The method of claim 1, wherein the identifying step comprises vibration testing of the rotationally periodic component.

3. The method of claim 1, wherein the determining step comprises analytically modeling the one or more modes.

4. The method of claim 1, wherein the step of forming and disposing a plurality of features results in the asymmetry pattern about the front side being the same or different from the asymmetry pattern about the back side.

5. The method of claim 1, wherein the forming and disposing step comprises at least one of adding or removing material from discrete regions of the component body.

6. The method of claim 5, wherein the component comprises a disc for a turbomachine, the disc comprising:
    the component body comprising a rotatable body having a rim disposed about a periphery thereof, wherein the disc comprises a bladed disc or an unbladed disc and the step of forming and disposing a plurality of features comprises at least one of adding or removing disc material from discrete regions of the disc.

7. A method for manufacturing a component resistant to traveling wave vibration, the component comprising a component body having a front side and a back side and the method comprising the steps of:
    obtaining data relating to a vibration response of a model of a rotationally periodic component;
    selecting one or more modes of the rotationally periodic component that exceed a threshold deflection limit;
    analytically modeling the one or more modes with an analytical model, each of the one or more modes having a pair of repeated eigenvalues associated therewith;
    determining an asymmetry pattern that separates each pair of repeated eigenvalues by a desired frequency split, wherein the step of determining the asymmetry pattern comprises:
        applying a proposed asymmetry pattern to the analytical model;
        analyzing the analytical model to determine if the proposed asymmetry pattern results in the desired frequency split for each pair of repeated eigenvalues associated with each of the one or more modes;
        if the proposed asymmetry pattern does not result in the desired frequency split, repeating the applying and analyzing steps until the proposed asymmetry pattern results in the desired frequency split, the proposed asymmetry pattern resulting in the desired frequency split comprising the asymmetry pattern; and
    at least one of adding or removing material according to the asymmetry pattern from a circumference of the front side of the component body and a circumference of the back side of the component body, the asymmetry pattern on the front side shifted circumferentially from the asymmetry pattern on the back side by an offset angle to define an asymmetrical component comprising the component resistant to traveling wave vibration.

8. The method of claim 7, wherein the obtaining data step comprises obtaining data from vibration testing of the model of the rotationally periodic component.

9. The method of claim 7, wherein the step of at least one of adding or removing material from the front side, the back side, or both the front and back sides of the component body result in the asymmetry pattern about the front side being the same or different from the asymmetry pattern about the back side.

10. The method of claim 7, wherein the component comprises a disc for a turbomachine, the disc comprising:
    the component body comprising a rotatable body having a rim disposed about a periphery thereof, wherein the disc comprises a bladed disc or an unbladed disc and the forming and disposing a plurality of features comprises at least one of adding or removing disc material from discrete regions of the disc.

11. A component resistant to traveling wave vibration, the component comprising:
   a component body having a front side and a back side; and
   a plurality of features arranged in a first asymmetric pattern about a circumference of the front side of the component body and arranged in a second asymmetric pattern about a circumference of the back side of the component body, the first asymmetric pattern shifted circumferentially from the second asymmetric pattern by an offset angle, with each of the plurality of features defined to separate each pair of repeated eigenvalues associated with a targeted mode, which deflects in excess of a threshold deflection limit in response to a traveling wave excitation.

12. The component of claim 11, wherein the first asymmetry pattern on the front side is the same or different from the second asymmetry pattern on the back side.

13. The component of claim 11, wherein a disc for a turbomachine comprises the component, the disc comprising:
   the component body comprising a rotatable body having a rim disposed about a periphery of the rotatable body, wherein the disc comprises a bladed disc or an unbladed disc and the targeted mode comprises a nodal diameter mode.

14. The component of claim 13, wherein the plurality of features are formed from disc material that is at least one of added to or removed from discrete regions of the disc.

15. The component of claim 13, wherein the first asymmetry pattern comprises an asymmetric pattern of cuts or protrusions on the rim that define interrupted rim projections.

* * * * *